Oct. 21, 1930.                B. DARROW                1,779,392
                          METHOD OF MAKING TIRES
                            Filed Oct. 4, 1929

Inventor
Burgess Darrow

By

Attorney

Patented Oct. 21, 1930

1,779,392

UNITED STATES PATENT OFFICE

BURGESS DARROW, OF AKRON, OHIO, ASSIGNOR TO THE GOODYEAR TIRE & RUBBER COMPANY, OF AKRON, OHIO, A CORPORATION OF OHIO

METHOD OF MAKING TIRES

Application filed October 4, 1929. Serial No. 397,275.

This invention relates to pneumatic tires, and it has particular relation to methods of constructing and arranging the plies and bead elements of such tires.

One object of the invention is to provide a method by which a tire having a relatively small or minimum inner diameter may be provided with beads that are permanently secured to the plies of the tire.

Another object of the invention is to provide a method of making tires by installing bead elements before and after the tire is shaped.

Another object of the invention is to provide a method of substituting beads in a tire during the operations of building the tire.

In building one kind of flat-built tire, a cylindrical band is provided which is shaped by shirring or gathering looped edges of the band upon bead elements, and then inflating a shaping member therein. It is necessary permanently to clamp, splice or otherwise secure the ends of such elements after the edges of the band have been gathered. These elements are in the form of metallic rings having gaps therein, or cords or wires. Although arrangements of this kind are convenient, they are somewhat disadvantageous because the resulting bead construction is not uniform circumferentially, and it is difficult to secure a permanent union between the bead elements and the edges of the tire bands through which they have been threaded. Moreover, in securing the ends of the bead elements, which are not continuous, flaws are likely to occur in the connections.

According to this invention, the edges of an endless or cylindrical band are shirred or gathered until they assume a relatively small diameter and subsequently a permanent bead element is applied thereto. It is preferable to insert a temporary bead element upon which the band edges may be gathered, and after the band has been shaped the permanent bead is substituted therefor.

For a better understanding of the invention, reference may now be had to the accompanying drawings, forming a part of the specification, of which;

Figure 1:
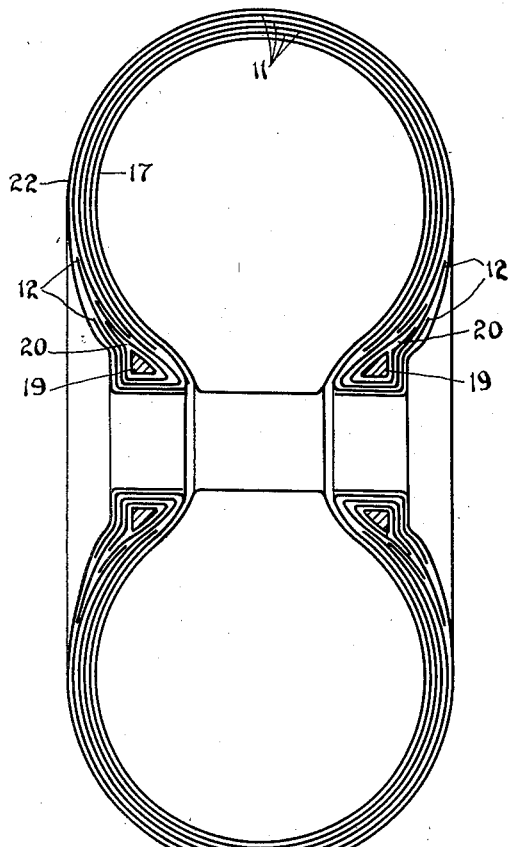
Figure 1 is a diagrammatical cross-sectional view of a tire built according to the invention.
Figure 3:
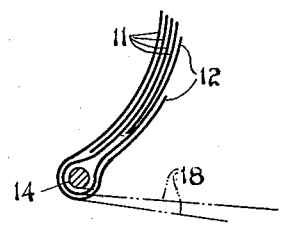
Figure 3 is a fragmentary cross-sectional view of a bead portion of a tire illustrating one of the steps of the method.
Figure 2:
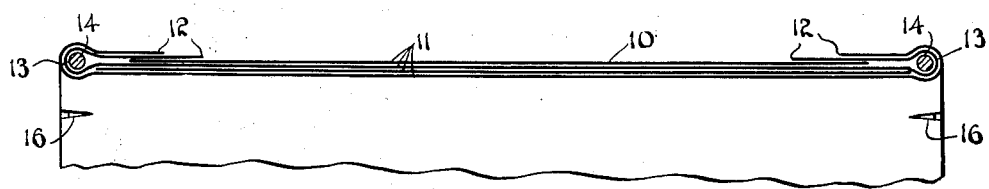
Figure 2 is a diagrammatical fragmentary cross-sectional view of a band of tire-building material employed in practicing the invention.

In practicing the invention, an endless band 10 is provided which is composed of plies 11 of rubberized cord or fabric tire-building material. A plurality of plies are lapped back upon the body of the band, as indicated at 12, thereby providing loops 13 at the opposite edges of the band. The edges of the band defining the loops 13 are gathered inwardly, preferably about the temporary bead elements 14 which are threaded through slits 16 cut through the loops. An inflatable member 17, inserted within the band, is supplied with fluid under pressure for the purpose of shaping the band into the form shown by Figure 1. Then by applying to the band edges suitable material, such as hydrocarbon, to loosen the lapped portions 12, the latter are drawn away from the body of the band, as indicated by the broken lines 18 of Figure 3. Permanent beads 19, preferably in the form of endless rings having anchoring strips 20 enclosing them, are installed at the band edges, and the latter are looped thereabout and secured in the relation indicated at 12 in Figure 1. A suitable covering 22 of rubber to provide a tread is applied to the band, and the entire assembly thus shaped is vulcanized to complete the tire.

Although I have illustrated only one form which the invention may assume and have described that form in detail, it will be apparent to those skilled in the art that the invention is not so limited, but that various modifications may be made therein without departing from the spirit of the invention or from the scope of the appended claims.

What I claim is:

1. A method of building tires which comprises applying temporary bead elements to the edge portions of a band of tire-building material, shaping the band into tire form, and substituting a permanent bead for the temporary bead.

2. A method of building tires which comprises threading temporary bead elements through the edge portions of a band of tire-building material, shaping the band into tire form, and substituting a permanent bead for the bead element.

3. A method of building tires which comprises looping the edge portions of a band of tire-building material, threading temporary bead elements through the looped edges, shaping the band into tire form, opening the looped portions and substituting permanent bead elements for the temporary bead elements, and securing the edge portions again in looped relation about the permanent bead.

4. A method of making tires which comprises shirring the lateral edge portions of a band of tire-building material, shaping the band into tire form, and applying inextensible, endless bead rings to the shirred portions.

5. A method of making tires which comprises forming an endless band of tire-building material, shirring the edge portions of the band upon members to define relatively small edge circumferences, and substituting endless bead rings for the members.

6. A method of making a tire casing which comprises shirring the lateral edge portions of an endless band of rubberized fabric, inflating a member within the band, applying inextensible beads to the shirred portions, and subjecting the structure to vulcanization in a mold.

7. A method of making a tire casing which comprises shirring the lateral edge portions of an endless band of rubberized fabric into relatively small annuli, inflating a member within the band, applying inextensible beads at the shirred portions of the band, and subjecting the structure to vulcanization in a mold.

8. A method of making a tire casing which comprises shirring the lateral edge portions of an endless band of rubberized fabric upon relatively small annular members, inflating a member within the band, removing the annular members, applying inextensible beads at the shirred portions of the inflated structure in place of the annular members, applying a rubber covering to the structure, and subjecting the structure to vulcanization in a mold.

9. A method of making a tire casing which comprises forming an endless band of flexible fabric, shirring the lateral edge portions into annuli of relatively small diameter, inflating the structure and forcing the shirred portions of the fabric into curved planes, applying inextensible beads to the shirred portions, applying a rubber covering, and subjecting the structure to vulcanization in a mold.

In witness whereof, I have hereunto signed my name.

Signed at Akron, in the county of Summit and State of Ohio, U. S. A., this 30th day of September, 1929.

BURGESS DARROW.